United States Patent [19]
Rishovd

[11] 3,785,424
[45] Jan. 15, 1974

[54] TIRE BEAD SEATER

[75] Inventor: Sigurad A. Rishovd, Minneapolis, Minn.

[73] Assignee: Royal Industries, Inc., Osseo, Minn.

[22] Filed: Aug. 2, 1971

[21] Appl. No.: 167,982

[52] U.S. Cl. ............................................. 157/1.1
[51] Int. Cl. ....................................... B60c 25/06
[58] Field of Search ........................... 157/1.1, 1.24

[56] References Cited
UNITED STATES PATENTS

| | | | |
|---|---|---|---|
| 3,238,989 | 3/1966 | Silvestrani | 157/1.24 |
| 3,552,469 | 1/1971 | Corless | 157/1.1 |
| 2,900,015 | 8/1959 | Harrison | 157/1.1 |
| 3,528,474 | 9/1970 | May | 157/1.1 |
| 3,675,705 | 7/1972 | Corless | 157/1.1 |

Primary Examiner—Granville Y. Custer, Jr.
Attorney—Andrew E. Carlsen et al.

[57] ABSTRACT

A method and apparatus for mounting tubeless tires on a wheel rim.

A tire mount-demount device of the class utilizing a plurality of movable jaws to receive and grip a vehicle wheel in a generally horizontal position is provided with a means, adjacent at least two wheel gripping jaws, for directing a massive volume of air into a tire that is loosely disposed on the wheel, while additional air under pressure is supplied to the customary valve on the wheel. The air supplied at the jaws is directed upwardly through the space between the lower bead of the tire and the lower edge of the rim of the tire.

The method comprises the steps of placing a wheel, having a tubeless tire loosely disposed adjacent the rims thereof, on top of a plurality of sources of air under pressure so as to cause the tire to expand and tend to seat the beads of the tire on the rims of the wheel. Additional air provided through the customary valve on the wheel may then easily complete the inflation of the tire.

32 Claims, 8 Drawing Figures

INVENTOR.
SIGURD A. RISHOVD
BY
Carlsen Carlsen & Sturm
ATTORNEYS

TIRE BEAD SEATER

BACKGROUND OF THE INVENTION

The satisfactory mounting and inflation of tubeless tires on vehicle wheels has seen the development of numerous prior art devices which are intended, through one means or another, to cause engagement of the tire beads with the rims of a wheel so that air under pressure may be contained within the tire and the tire inflated to a suitably operating pressure for subsequent mounting and use on a vehicle. The prior art has seen development of devices which bridge the gap which may exist between one bead and the rim of a wheel upon which the tubeless tire is to be mounted, thus forming a closed chamber into which air may then be introduced, either through the normal valve on a tire or through separate means connected to the mechanical bridging arrangement. Such devices have even taken the forms of kettles that are adapted to be disposed over the top of a wheel upon which a tubeless tire is loosely disposed so that engagement with the top central periphery of the sidewall of a tire by the airtight kettle serves to create a substantially airtight structure when the bottom sidewall and bead of the tire is allowed to fall, through gravity, into substantial airtight seating relationship with the lower rim of the wheel. An example of such a device may be seen in the Mueller U.S. Pat. No. 3,461,938. The limitations of this and other similar constructions are believed readily apparent to those skilled in the art since a large amount of sometimes cumbersome and unwieldy accessory equipment is necessary to perform the desired operation on the mounting and inflating of a tubeless tire.

Subsequent development of other forms of apparatus has resulted in the suggestion set forth in the Ranallo patent, U. S. Pat. No. 2,874,759, issued Feb. 24, 1959, which suggests that air under pressure might be introduced around the periphery of one of the sidewalls of the tire and the rim of the wheel, upon which the tire is to be mounted while urging the other sidewall and bead into airtight relationship with the other rim of the wheel. While such apparatus is not clearly illustrated in this patent, subsequent development has lead to, for example, the Corless patent, U.S. Pat. No. 3,552,469, issued Jan. 5, 1971. In the Corless patent, a device is provided which may direct air into the interior of a tire that is disposed on a wheel with the lower sidewall and bead positioned in engagement with the lower rim of the wheel while the upper sidewall and bead are spaced apart from the rim of the wheel. An annular manifold completely encircles the tire and is adapted to inject air under pressure into this space that is present between the upper bead and the upper rim of the wheel. The device in the Corless patent is shown as a portable device that is operative as an accessory to be utilized in the sales and repair of tubeless tires. Commercial developments of these devices have thus appeared on the market as, for example, an Omega Jet Tire Bead Seater believed to be available from a company known as Bruce Caulkins, Inc. of Harpers Woods, Mich., and a like device described as a Bead Expander and Tire Inflater, which has been placed upon the market by a company known as Solar Industries, Inc. of Osseo, Minn. In each of these commercial embodiments, an annular ring is intended to be disposed on top of a substantially horizontally positioned wheel having a tubeless tire loosely disposed thereon with the lower bead seat in substantial airtight engagement with a portion of the lower rim of the wheel.

SUMMARY OF THE INVENTION

Upon perceiving the desirability of eliminating the nuisance of providing accessory equipment and recognizing that much of the prior art equipment has proven actually dangerous under normal operation, apparatus has been developed which combines the features of a tire mount-demount machine with an easy, reliable and efficient mounting and inflating apparatus for tubeless tires.

My invention utilizes a method of seating and inflating a tubeless tire on the rims of a wheel which includes the steps of directing a substantial quantity of air under pressure at radially spaced apart locations adjacent the lower bead seat and lower rim of a wheel upwardly and into the interior of a tire which is loosely disposed on the rim of the wheel. As the upper bead moves into airtight relationship with the upper rim of the wheel, continued expansion of the air directed upwardly, without any auxiliary sealing means, serves to exapnd the tire to a point at which the lower bead moves downwardly into engagement with the lower rim of the wheel so as to provide a complete airtight relationship with both rims of the wheel so as to allow subsequent complete inflation to a desired pressure of the tire through the normal valve customarily disposed on the rim of a wheel.

My apparatus provides for a plurality of radially spaced sources of air under pressure disposed in predetermined relationship with the wheel engaging jaws on a tire mount-demount machine, such as that presently marketed by the assignee of this invention, its Model 2000A Tire Mount-Demount apparatus. The sources of air under pressure that are directed upwardly adjacent the wheel engaging jaws of a wheel and tire assembly when held in place by said jaws, might take the form of an orifice disposed on each movable jaw in a tire mount-demount apparatus or, a more limited range of usefulness may be achieved by stationarily disposing radially spaced sources of air under pressure adjacent the wheel gripping jaws on a tire mount-demount machine.

My invention further comprises control apparatus for controlling and directing the flow of air under pressure to a wheel and tire assembly to be mounted and inflated, which incorporates features providing efficient and safe operation of the apparatus.

It is, therefore, an object of my invention to provide an improved mounting and inflating apparatus for mounting tubeless tires on vehicle wheels.

It is a still further object of my invention to pro-vide an improved method of mounting and inflating tubeless tires on vehicle wheels.

Another object of my invention is to provide safe and efficient controlling means for utilization in connection with the apparatus and method of my invention.

These and other objects of my invention will become apparent from a consideration of the appended specification, claims and drawing in which:

Figure 1:
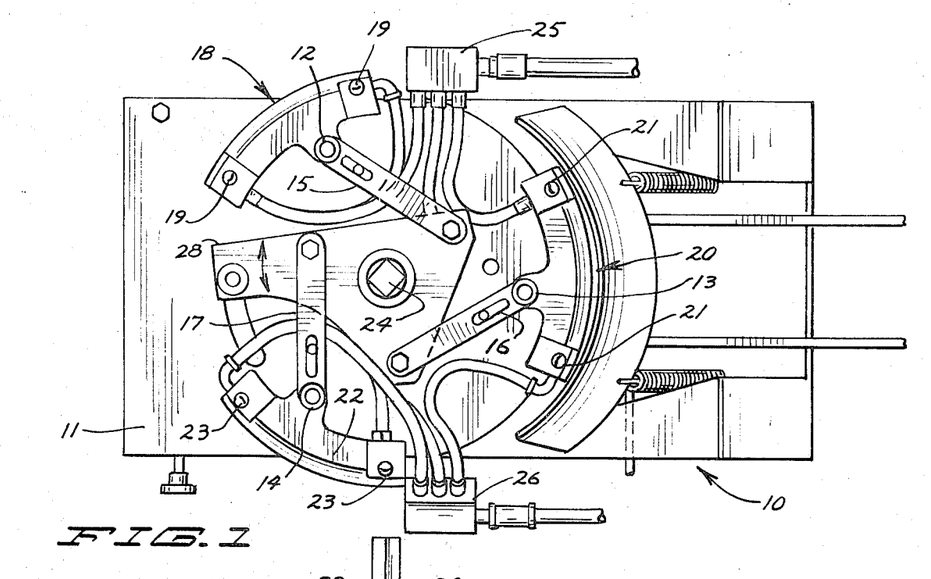
FIG. 1 is a top plan view of a tire mount-demount machine to which the principles of my invention have been applied.
Figure 2:
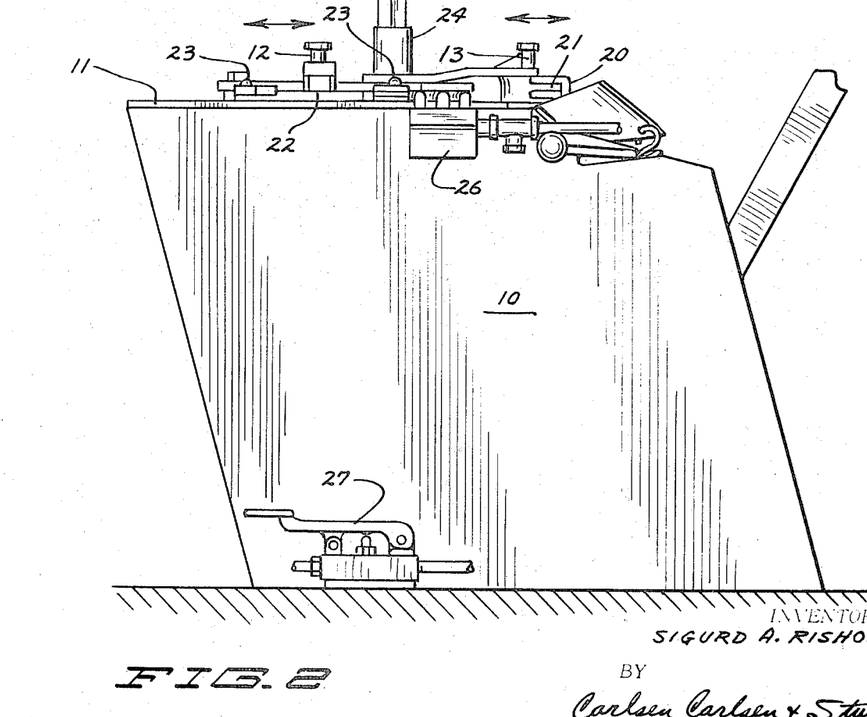
FIG. 2 is an elevational side view of the apparatus of FIG. 1.

Referring now to FIGS. 1 and 2 of the drawings, a tire mount-demount machine shown in fragmentary view is designated by reference character 10. For the sake of clarity, some of the operating mechanisms have been omitted or left unidentified, but for the convenience of the reader, reference is made to the commercially available device known as a Command Aire, which has been marked by Bishman Manufacturing Company of Osseo, Minn., now a Division of the assignee of the present invention.

Mount-demount machine 10 has a top base portion 11 upon which is rotatably disposed a tool receiving shaft 24 that extends generally vertically upwardly therethrough. Disposed at spaced radial positions about the axis of rotation of tool shaft 24 are a plurality of movable base members 15, 16 and 17, each of which has a jaw member 12, 13 and 14, respectively, disposed for radially outwardly movement as a base plate 28 to which they are connected at their inner ends is rotated about the axis of rotation of tool shaft 24 by suitable means (not shown). Also disposed on the outer ends of each of the movable base members 15, 16 and 17 are a plurality of air sources 18, 20 and 22, respectively, each having generally upwardly directed orifice portions 19, 21 and 23, respectively. Each of air source members 18, 20 and 22 are suitably connected to manifold members 25 and 26 through flexible tubing. Manifold members 25 and 26 are adapted to be connected to a suitable source of air under pressure through suitable means, (not shown) and may include appropriate valving mechanism shown generally as foot operated valve 27 mounted near the bottom portion of mount-demount machine 10.

In operation a steel wheel is loosely disposed on top base member 11 with the three jaws 12, 13 and 14 fully retracted inwardly so as to lie inside of the lower rim of the wheel. As base member 28 to which members 15, 16 and 17 is rotated counterclockwise of FIG. 1 of the drawings, the jaws will move outwardly to engage the inner periphery of the lower rim of the wheel and securely and stationarily hold the same in position. A tubeless tire may then be disposed on the wheel for the subsequent inflating operation. It might also be noted at this point that the output of valve 27 is also connected through suitable means (not shown) to the usual valve found on all wheels that are designated to be used with tubeless tires. It may also be noted that each of the air source members 18, 20, and 22 is mounted upon and associated with each of the jaw members 12, 13 and 14 in a predetermined relationship spaced slightly radially outwardly of each of the jaw members as they are engaged in gripping relationship with the inner periphery of the lower rim of a wheel and in generally horizontal disposition.

When it is desired to complete the mounting and inflate a tire on the wheel on a machine, valve 27 is actuated to release a substantial quantity of air to air sources 18, 20 and 22 while simultaneously applying air under pressure through the usual valve disposed in one rim of the wheel. As the air is discharged upwardly through orifices 19, 21 and 23 at the radially spaced positions around the periphery of the wheel and tire, the top bead of the tire may effect an airtight relationship with the top rim of the wheel. This may occur due to the pressure of the air being injected into the assembly through the radially spaced apart portions of the lower tire bead and the lower rim of the wheel adjacent the air sources 18, 20 and 22. Further injection of air under pressure in the upward direction serves to cause the tire to continue to expand until the lower bead starts to seat upon the lower rim of the wheel at which point the air supplied to the interior of the tire through the normal valve on the wheel serves to complete the seating of the tire beads on the upper and lower rims and to fully inflate the tire to the desired operating pressure. A sequence valve (not shown) as illustrated below in connection with FIGS. 3–8 may be used to provide the function set forth above.

It may be noted that while the air sources 18, 20 and 22 are shown in the form of elongated arcuate manifolds having an upwardly opening orifice at each end, successful operation has been obtained through the use of only one orifice at each of three radially spaced wheel gripping jaws. It may further be noted that under some conditions of operation, it may be desirable for the operator of the machine to physically provide a slight lifting force to the deflated tubeless tire as the air injection is started so as to assist in the seating of the upper bead seat on the tire with the upper rim of the wheel.

Referring now to FIGS. 3, 4, 5, 6, 7 and 8 of the drawings, a preferred embodiment of my invention is illustrated as applied to a tire mount-demount machine indicated generally by reference character 30. A number of the details of the operation of tire mount-demount machine 30 have been omitted for the sake of clarity and if the reader desires further details, they may be obtained from a consideration of the copending application for U.S. Letters Pat. Ser. No. 122,983, filed Mar. 10, 1971, in the name of John D. McKinney entitled, TIRE CHANGER, now U.S. Pat. No. 3,722,570, issued Mar. 27, 1973, and assigned to the assignee of the present invention. Machine 30 is shown having a sloped top base 31 and a bottom base 32. First and second stationary jaw members 33 and 34 are shown mounted upon and spaced apart near the middle of top base member 32. A movable jaw member 35 is shown radially spaced apart from jaw members 33 and 34 and in proximity with and in predetermined relationship with a movable tool shaft indicated by reference character 36. Tool shaft 36 extends generally normal to the sloped surface of top base 31 and, together with movable jaw member 35, is adapted to be slidably disposed therein so as to be positioned in and retain a predetermined relationship with movable jaw 35 and stationary jaws 33 and 34. Similarly, a movable jet base member 37 is provided for attachment to jets 38 and 39. Movable jet base member 37 is mounted over tool shaft 36 and is therefore movable therewith in the direction indicated on FIG. 5 of the drawings. Hence, jets 38 and 39 may slide with movable tool shaft 36 as the inner periphery of the lower rim of a wheel is locked in place and gripped by jaw members 33, 34 and 35 on mount-demount machine 30. It may be noted that jets 38 and 39 each have a plurality of orifices 47 and 48, respectively, and that these orifices may conveniently be directed in a generally upwardly direction at an angle of approximately 40 degrees with respect to the axis of rotation of tool shaft 36. Jet members 38 and 39 are shown comprised of arcuate lengths of tubular material which acts as a manifold for each of the orifices that may be present therein. Each of jet members 38 and 39 are shown having an arcuate extent of approximately 110° so that the total radial distance that air under pressure is supplied to the lower rim and lower bead of a wheel and tire is approximately 220°.

A wheel 40 having a top rim 41, a bottom ring 42 and a valve 43 is shown in several views in operative disposition on mount-demount machine 30. Similarly, a tire 44 having a top bead 45 and a bottom bead 46 is shown disposed on wheel 40.

Figure 3:
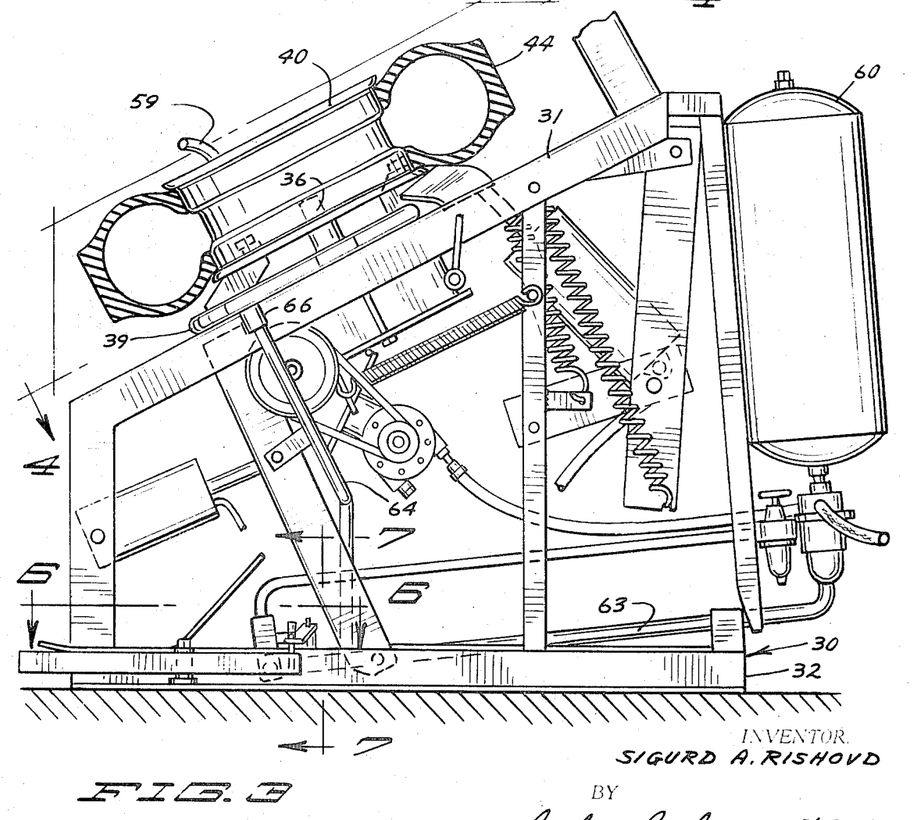
FIG. 3 is a side elevational view showing another form of tire mount-demount machine to which the principles of my invention have been applied.
Figure 6:
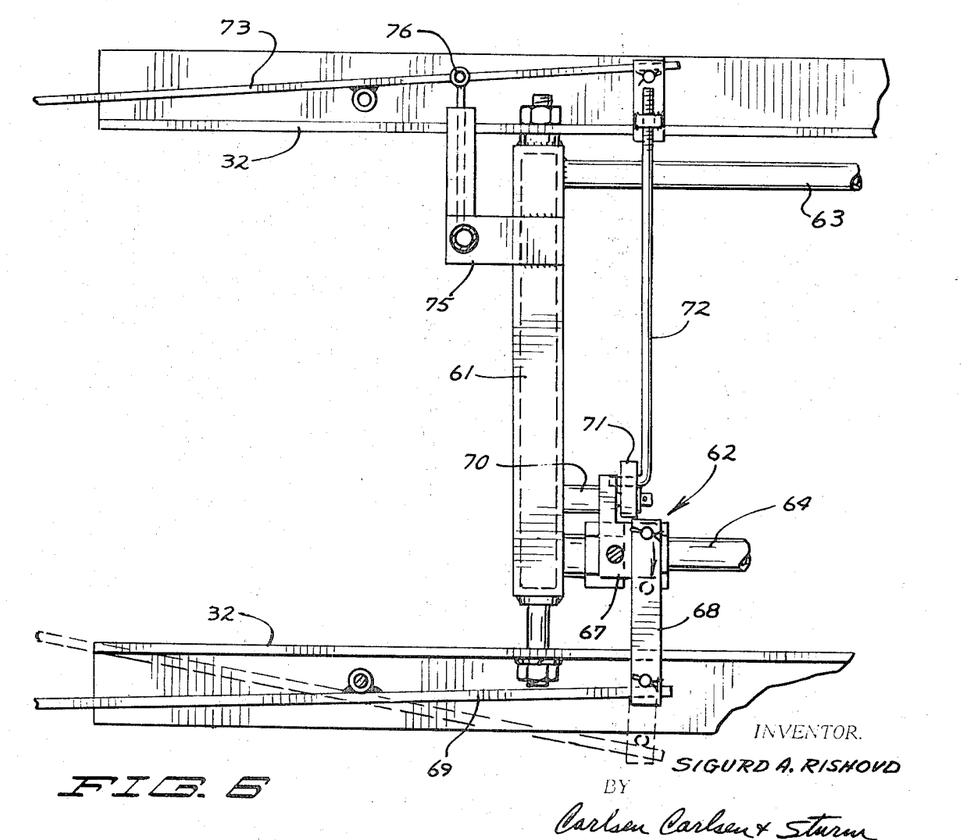
FIG. 6 is a top sectional view of a portion of the control apparatus taken along section line 6—6 on FIG. 3 of the drawings.
Figures 7, 8:
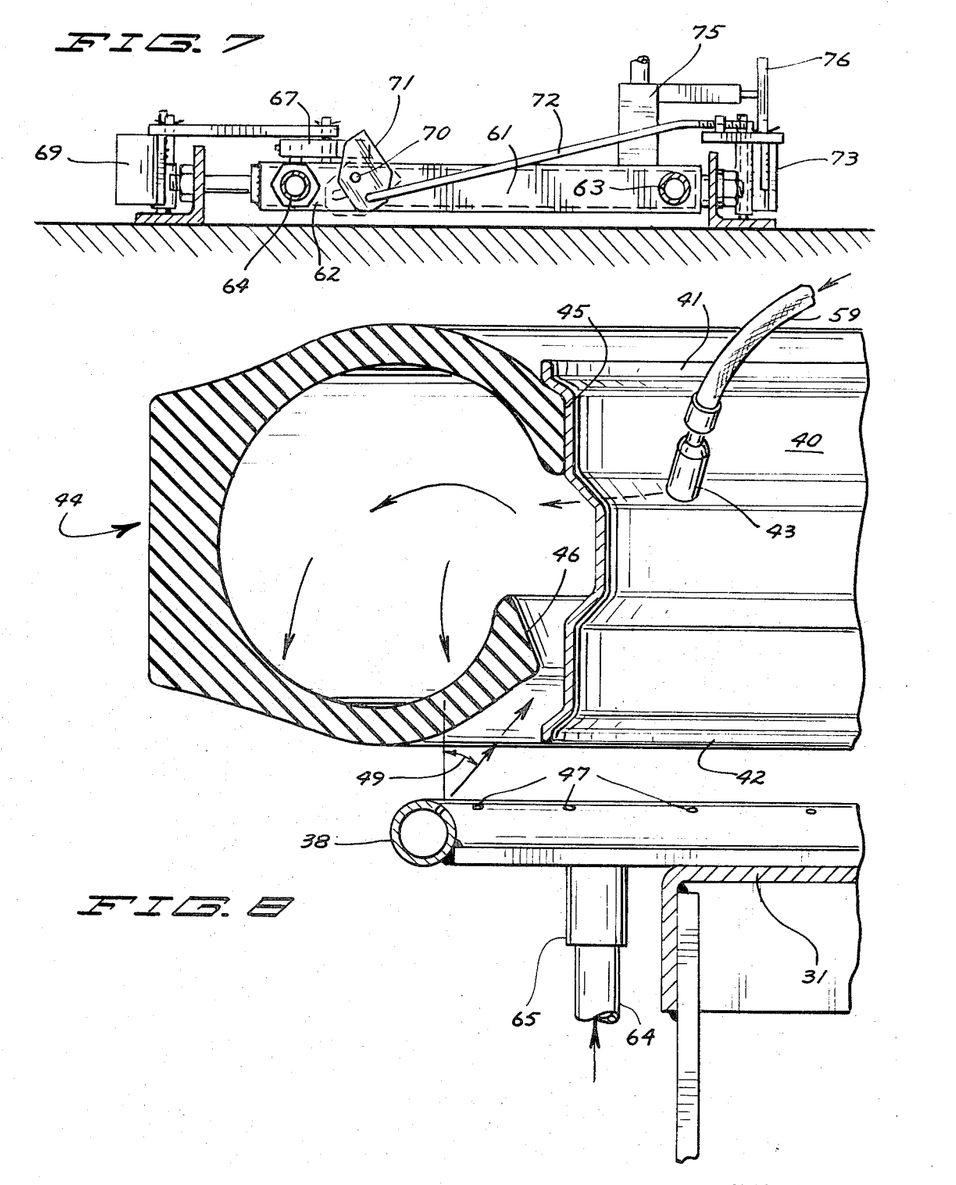
FIG. 7 is a front elevational view of a portion of the apparatus of FIG. 3 taken along section 7—7.
FIG. 8 is an enlarged, fragmentary sectional view of a wheel and a tubeless tire that is being expanded into bead seating relationship with the rim of the wheel by the injection of air under pressure through the manifolding means shown in the embodiment of FIGS. 3, 4 and 5.

A substantial source of air under pressure is provided at tank 60, which, together with manifold 61 and valve 62 and valve 75 is utilized to operate a source of energy for the purposes desired under the present invention. Tank 60 is shown connected to manifold 61 through air line 63. Jets 38 and 39, each having inlet tubes 65 and 66, respectively, may be connected to the output of inflation valve 62 through air line 64. Valve 43 on wheel 40 may also be connected to air line 64 through suitable means (not shown) through air line 59.

Referring specifically to FIGS. 6 and 7 of the drawing, manifold 61 is shown having inflation valve 62 disposed at one end and a jaw valve 75 disposed at the other end. Inflation valve 62 includes a rotatable valve operator 67 that is connected through a link 68 to the end of a lever means 69 disposed at the lower front of base member 32 on mount-demount machine 30. It may be noted that valve operator 67 has a laterally extending portion which overlies a shaft 70 extending forwardly of the side of manifold 61. A safety latch 71 is rotatably disposed on shaft 70 and includes an upwardly projecting portion which will prevent actuation of valve operator 67 to open valve 62 unless predetermined conditions of operation have previously been obtained. This is accomplished by connecting latch 71 to a further lever 73 disposed at the other forward bottom portion of base 32 to a link means 72. Lever 73 also has an upwardly extending operator 76 which is adapted to engage and open jaw valve 75 to energize movable jaw 35 so that it must engage and grip a wheel, such as 40, before any air under pressure can be supplied from jets 38 and 39 and to valve 43 on wheel 40. Jet members 38 and 39 may, under some circumstances, be stationarily disposed on the base of a tire changer or the like.

Figure 4:
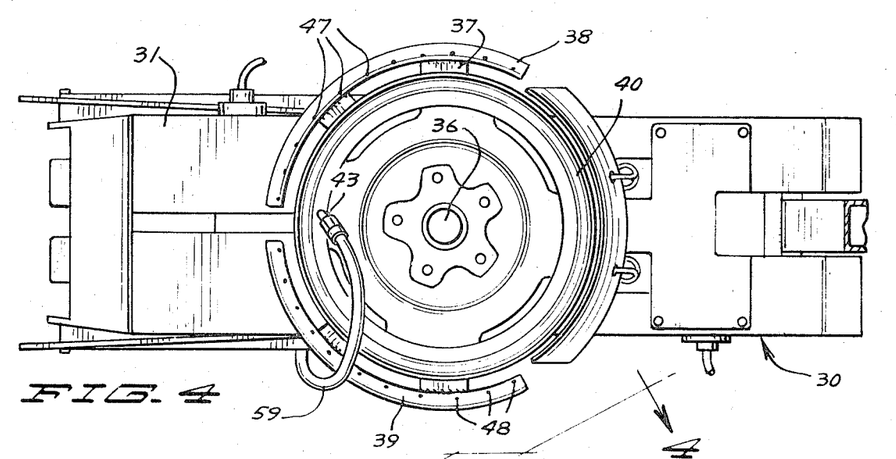
FIG. 4 is a top elevational view of the apparatus shown in FIG. 4 with a wheel operatively disposed on the apparatus.
Figure 5:
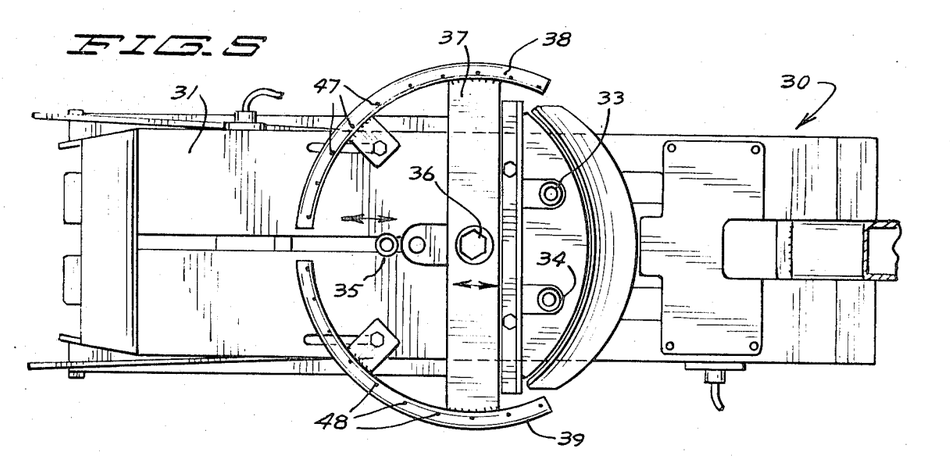
FIG. 5 is a like top plan view of the apparatus shown in FIGS. 3 and 4 without a wheel in place on the machine.

It may also be noted from FIG. 4 of the drawings that jet members 38 and 39 may have a radius substantially that of the wheel upon which the tire is to be mounted.

OPERATION

The embodiment of FIGS. 3-8 operates in substantially the same manner as set forth above in that a wheel is chucked on a plurality of jaws, an uninflated tubeless tire is disposed on the wheel, and radially spaced jets of air are supplied upwardly through the bottom rim and bottom bead seat to cause the tire to expand and the beads to be seated into engagement with the rims of the wheel so that the inflation of the tire and mounting upon the wheel may be completed by the application of air under pressure through valve 43 on wheel 40.

In providing the functions desired on mount-demount machine 30, I have found it desirable to utilize a control apparatus which insures that the apparatus will not be used improperly since the injection of a large amount of air under pressure would be a dangerous circumstance. Therefore, in the illustrations on FIGS. 6 and 7, it will be seen that manifold 61 connected to air tank 60 includes an interlocking arrangement whereby lever 69 that is utilized to effect the injection of air upwardly into the wheel and tire cannot be operated until the wheel gripping jaws have been energized. This is accomplished by the use of a latch 71 that is connected to lever 73 that must be actuated to energize the movable wheel jaw operating mechanism through its valve 75. As jaw lever 73 is moved in a clockwise direction, it must energize jaw valve 75 through actuator 76. Simultaneously, linkage 72 connected to latch 71 rotates it about shaft 70 so that it may move out of the way of the lateral extension of operator 67 on air valve 62. Once this has been accomplished, valve actuator 67 may be turned to open valve 62 through movement of injection lever 69 in a clockwise direction.

I claim:
1. In combination with a tire mount-demount apparatus of the class having a plurality of movable jaws to receive and grip a vehicle wheel in a substantially horizontal plane
   means on said tire mount-demount apparatus, adapted to be connected to a source of air under pressure, for directing a quantity of air upwardly toward the lower rim of a wheel at circumferentially spaced apart positions adjacent to at least two of a plurality of wheel gripping jaws.
2. The apparatus of claim 1 in which the means for directing a quantity of air upwardly toward the lower rim of a wheel is disposed on said plurality of wheel gripping jaws.
3. The apparatus of claim 1 in which the means for directing a quantity of air upwardly toward the lower rim of a wheel is stationarily disposed on the tire mount-demount apparatus adjacent to the plurality of movable jaws thereon.
4. The apparatus of claim 1, in which the means for directing a quantity of air upwardly toward the lower rim of a wheel is operative to direct said quantity of air at an angle of substantially 40 degrees with respect to a line normal to the plane of said wheel and toward the axis of rotation of said wheel.
5. The apparatus of claim 1, in which the means for directing a quantity of air upwardly toward the lower rim of a wheel is comprised of at least two circumferentially spaced apart arcuately extendant members.

6. The apparatus of claim 5 in which the radius of the arcuately extendant members is substantially the radius of a wheel upon which a tire is to be mounted and inflated.

7. The apparatus of claim 1, in which the arcuate extent of the means for directing a quantity of air upwardly toward the lower rim of a wheel is less than 300°

8. The apparatus of claim 1, in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

9. The apparatus of claim 8 in which the means for connecting the means for directing a quantity of air upwardly toward the lower rim of a wheel includes first and second valve means, said first means being operative to energize the movable jaws to grip a vehicle wheel and said second valve means being energizable only after said first valve means is energized, said second valve means being connected to said means for directing a quantity of air upwardly toward the lower rim of a wheel.

10. The method of mounting a tubeless tire on the rims of a wheel comprising the steps of;
 a. loosely disposing a tubeless tire on the rims of a wheel;
 b. placing the wheel and tire in a substantially horizontal position;
 c. directing air under pressure upwardly into the interior of the tire through the space between the lower bead of the tire and the lower rim of the wheel at a plurality of circumferentially spaced positions; and
 d. directing air under pressure into the interior of said tire.

11. The method of claim 10 in which the air under pressure is directed into the interior of the tire over an arcuate extent of up to 300 radial degrees.

12. The method of claim 10 in which the air under pressure is supplied from at least two circumferentially adjacent positions.

13. The method of claim 10 in which the plurality of circumferentially spaced apart positions are adjacently disposed so as to effect a substantially circumferentially continuous supply of air under pressure over at least two arcuate positions of a wheel.

14. The method of claim 10 in which there is at least one arcuate space without air under pressure intermediate the plurality of circumferentially spaced apart positions for the direction of air under pressure upwardly into the interior of the tire.

15. In combination with tire processing apparatus of the class having a means for mounting a wheel and a deflated tire with their axes of rotation in predetermined relationship to a base, circumferentially spaced apart means for directing a circumferentially discontinuous substantial quantity of air upwardly toward the rim of a wheel adjacent said base, said means being disposed on said base in predetermined relationship with the axis of rotation of a wheel and tire when disposed on said base, said means also being adapted to be connected to a source of air under pressure.

16. The method of mounting a tubeless tire on the rims of a wheel comprising the steps of;
 a. providing a base having an axis extending normal to the plane thereof;
 b. placing a wheel having a tubeless tire loosely disposed thereupon concentrically of the axis on said base;
 c. providing a plurality of circumferentially spaced apart sources of air directed toward the rim of the wheel adjacent said base at positions radially of the axis of said base; and
 d. directing air under pressure into the interior of said tire.

17. The apparatus of claim 2 in which the means for directing a quantity of air upwardly toward the lower rim of a wheel is operative to direct said quantity of air at an angle of substantially 40° with respect to a line normal to the plane or said wheel and toward the axis of rotation of said wheel.

18. The apparatus of claim 3 in which the means for directing a quantity of air upwardly toward the lower rim of a wheel is operative to direct said quantity of air at an angle of substantially 40° with respect to a line normal to the plane or said wheel and toward the axis of rotation of said wheel.

19. The apparatus of claim 2 in which the means for directing a quantity of air upwardly toward the lower rim of a wheel is comprised of at least two circumferentially spaced apart arcuately extendant members.

20. The apparatus of claim 3 in which the means for directing a quantity of air upwardly toward the lower rim of a wheel is comprised of at least two circumferentially spaced apart arcuately extendant members.

21. The apparatus of claim 4 in which the means for directing a quantity of air upwardly toward the lower rim of a wheel is comprised of at least two circumferentially spaced apart arcuately extendant members.

22. The apparatus of claim 2 in which the arcuate extent of the means for directing a quantity of air upwardly toward the lower rim of a wheel is less than 300°.

23. The apparatus of claim 3 in which the arcuate extent of the means for directing a quantity of air upwardly toward the lower rim of a wheel is less than 300°.

24. The apparatus of claim 4 in which the arcuate extent of the means for directing a quantity of air upwardly toward the lower rim of a wheel is less than 300°.

25. The apparatus of claim 5 in which the arcuate extent of the means for directing a quantity of air upwardly toward the lower rim of a wheel is less than 300°.

26. The apparatus of claim 6 in which the arcuate extent of the means for directing a quantity of air upwardly toward the lower rim of a wheel is less than 300°.

27. The apparatus of claim 2 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

28. The apparatus of claim 3 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

29. The apparatus of claim 4 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

30. The apparatus of claim 5 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

31. The apparatus of claim 6 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

32. The apparatus of claim 7 in which means connecting the means for directing a quantity of air upwardly toward the lower rim of a wheel are provided with further means operative to energize the movable jaws to grip a vehicle wheel previous to supplying a quantity of air to the means for directing said quantity of air toward the lower rim of a wheel.

* * * * *

Disclaimer

3,785,424.—*Sigurd A. Rishovd*, Minneapolis, Minn. TIRE BEAD SEATER. Patent dated Jan. 15, 1974. Disclaimer filed Dec. 14, 1979, by the assignee, *B & J Manufacturing Company*.

Hereby enters this disclaimer to claims 3 and 20 of said patent.

[*Official Gazette, April 1, 1980.*]